United States Patent [19]

Davis, Jr.

[11] 3,951,356
[45] Apr. 20, 1976

[54] TAPE TRANSPORT
[75] Inventor: Virgil W. Davis, Jr., Glen Ellyn, Ill.
[73] Assignee: Borg-Warner Corporation, Chicago, Ill.
[22] Filed: Jan. 2, 1974
[21] Appl. No.: 430,293

[52] U.S. Cl. .............................................. 242/192
[51] Int. Cl.² ..................... G03B 1/04; G11B 15/32
[58] Field of Search ........................... 242/192, 54.1

[56] References Cited
UNITED STATES PATENTS

| 2,605,056 | 7/1952 | De Kanski et al. | 242/54.1 |
| 3,370,804 | 2/1968 | Payton | 242/192 |
| 3,460,781 | 8/1969 | Uber | 242/192 |
| 3,482,800 | 12/1969 | Barnett et al. | 242/192 |
| 3,638,880 | 2/1972 | Hollingsworth | 242/192 |

Primary Examiner—Leonard D. Christian
Attorney, Agent, or Firm—James J. Jennings, Jr.

[57] ABSTRACT

A tape transport of the type with a resilient capstan abutting the tape packs on the supply and takeup reels includes a bias unit coupled between the supply reel support and takeup reel support to urge both reels against the capstan with the same force. A drag torque is applied to the supply reel during operation to maintain the appropriate tape tensions in the system.

3 Claims, 5 Drawing Figures

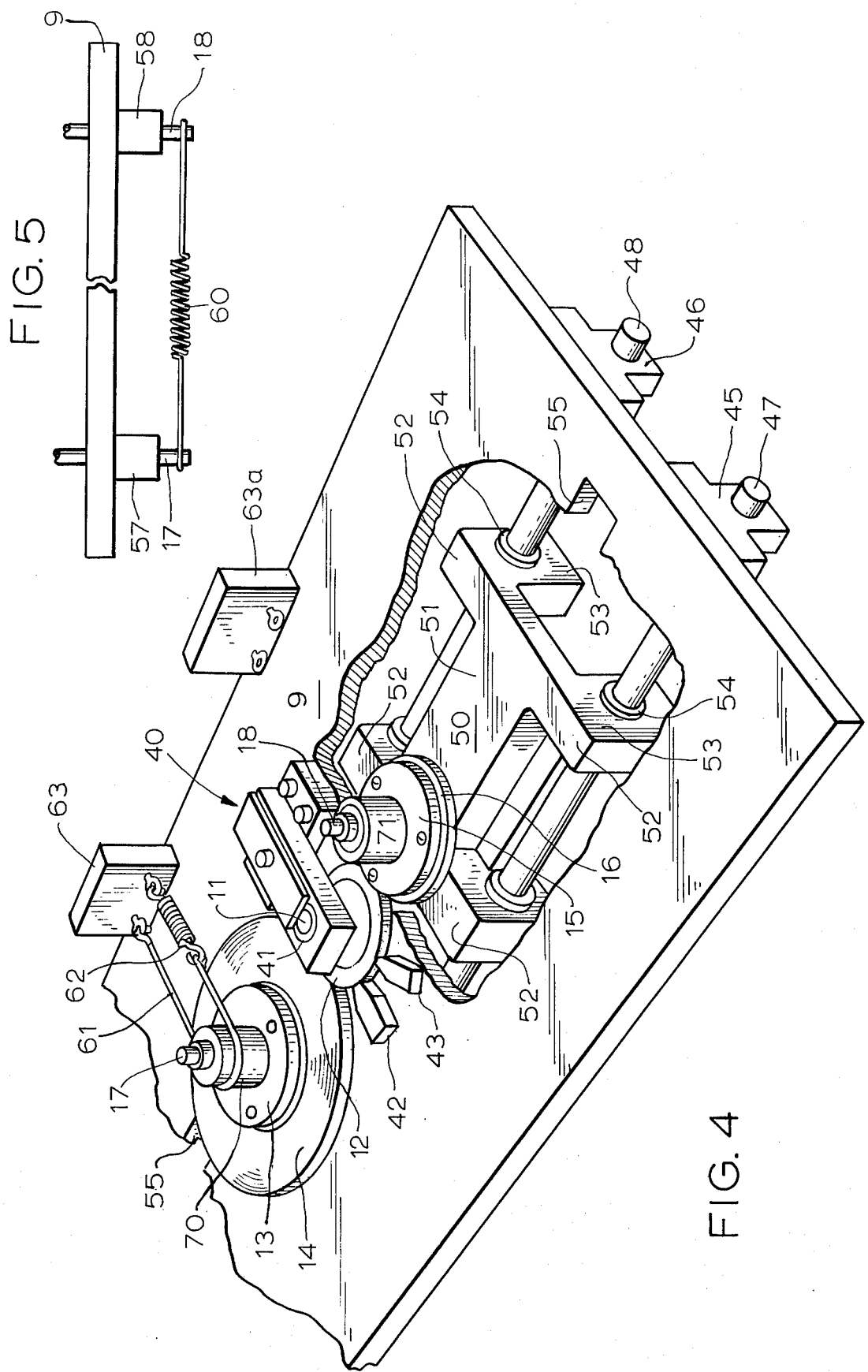

TAPE TRANSPORT

BACKGROUND OF THE INVENTION

In the information handling technology, the amount of information which can be processed at a given time is limited by various physical conditions. In a tape transport where magnetizable (more generally termed "magnetic") tape is passed from a supply reel past a recording and/or reproducing head to a takeup reel, the amount of information deposition or recall which occurs as the tape passes the head is a function of the tape speed. Accordingly various attempts have been made to increase the speed of tape movement from the supply reel to the takeup reel.

One approach to increasing tape speed includes shortening the route from the supply reel to the takeup reel. Instead of a longer path over tape guides, drive capstans and past the tape heads, it was found that a resilient capstan could be positioned between the supply and takeup reels, abutting the tape pack on the supply reel and also the tape pack on the takeup reel. It was also found that the tape could be moved very rapidly with this arrangement, without any supporting flanges for the tape packs on both reels. However various difficulties in such transports have prevented wide acceptance. One drawback is the requirement for a greater force between the takeup reel and capstan than the force present between the supply reel and the capstan. This difference in forces is necessary to maintain the appropriate tape tensions in the system and to keep the tape in its desired path. In general known solutions to the difference-in-forces problem have included support arrangements for biasing the supply and takeup reels toward the capstan, with some means to insure the bias force of the takeup reel exceeds that of the supply reel.

It is therefore a principal consideration of this invention to provide a tape transport capable of moving tape between the supply and takeup reels at a very high speed, of the order of 1,000 inches per second (ips) rather than 10 or 100 ips.

Another important consideration of the invention is the provision of such a tape transport with a substantially simplified arrangement for maintaining the requisite tape tensions and alignments in the system.

SUMMARY OF THE INVENTION

The present invention is useful with a tape transport of the type which includes a capstan having a resilient outer surface, and first and second reel supports each mounted for movement toward and away from the capstan. The supply reel has a shaft portion received in the first reel support, and the takeup reel also has a shaft portion which is received in the second reel support. The reels are positioned such that the magnetic tape packs (or the empty reel) can abut the capstan.

Particularly in accordance with this invention, a bias means is provided and coupled to both the first and second reel supports, thus urging both the supply reel and the takeup reel towards the capstan with the same force. Brake means is also provided and positioned to apply a drag force on the supply reel during tape transfer, thus maintaining the requisite tape tensions in the system.

THE DRAWINGS

In the several figures of the drawings like reference numerals identify like components, and in the drawings:

FIG. 4 is a perspective view, partly broken away, of one embodiment of the present invention; and FIG. 5 is a partial side view, supplementing the illustration of FIG. 4.

DETAILED DESCRIPTION OF THE INVENTION

Figure 1:
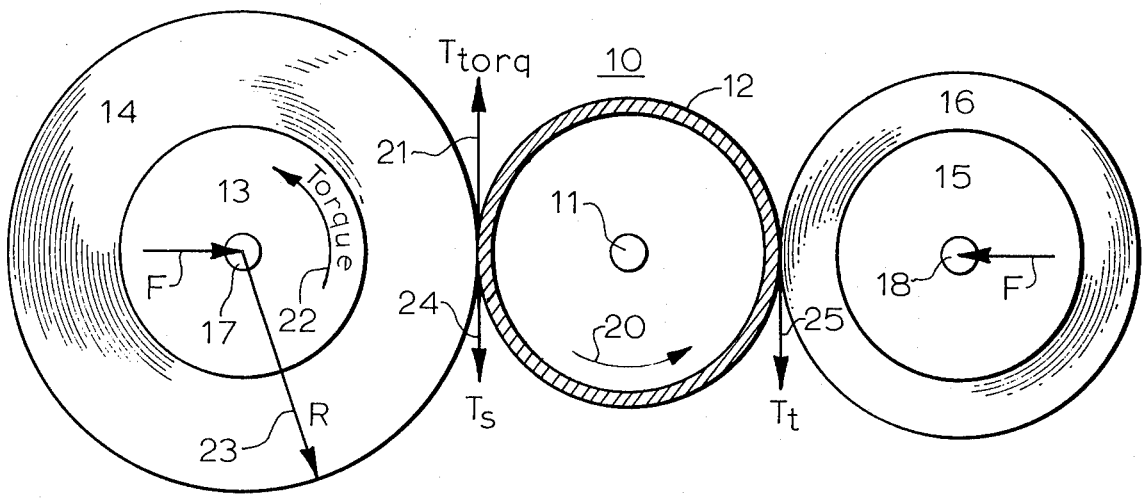
FIG. 1 is a diagramatic illustration.

FIG. 1 depicts the basic reel-capstan configuration of the tape transport. Capstan 10 includes a central shaft 11 for coupling to a drive motor (not shown). The outer periphery of the capstan is coated with an elastomer 12, which can be rubber or some other suitable resilient material. Supply reel 13 supports a tape pack 14 thereon, so that the tape pack abuts the resilient surface 12 of drive capstan 10. Likewise takeup reel 15 supports a tape pack 16 thereon. Supply reel 13 includes a central shaft 17, and takeup reel 15 likewise includes a central shaft 18. These shafts are themselves received in suitable carriages (not shown) or other support bases which are movable toward and away from capstan 10 as the diameters of the tape packs 14 and 16 vary during operation of the system.

The contact pressures between the supply reel and the capstan, and the takeup reel and the capstan, are varied by varying the force denoted by the arrow F. As the capstan is driven in the direction indicated by arrow 20, tape is metered from the pack 14 on the supply reel to the capstan at a rate essentially determined by the elastomer geometry and the force F on the supply reel. The tape removed from the supply reel passes around the capstan until it reaches the takeup reel, where it leaves the capstan and is wound on the tape pack 16 of the takeup reel at essentially the same rate, with the winding tension being controlled by the force F of the takeup reel.

FIG. 1 includes an arrow 21 representing a force $T_{torq}$, which, as far as the capstan-supply reel interaction is concerned, is equal in effect to a tension force. However $T_{torq}$ is not an actual tension in the tape pack itself, but only acts on the surface of the tape pack. This force $T_{torq}$ can be considered as a function of the reaction torque of supply reel 13 (which reaction torque is represented by the arrow 22) divided by the effective radius arm 23 of the combination of the supply reel and the tape pack.

The arrow 24 represents the tension $T_s$ in the supply reel tape at the point where it leaves the tape pack 14 to be wound around the capstan. If there were no tension $T_s$, then the drag force $T_{torq}$ would act to reduce the velocity ratio $V_r$ between the supply reel and the capstan. This velocity ratio $V_r$ is considered as the ratio of the surface speed of the combined supply reel and tape pack to the surface speed of the capstan, considering an undeformed portion of the resilient coating 12 of the capstan. The effect of the drag tension $T_{torq}$ in overcoming the tape tension $T_s$ to reduce the velocity ratio $V_r$ is similar to that which occurs at the takeup reel-capstan area as the tape tension $T_t$ (arrow 25) is increased.

Figure 2:
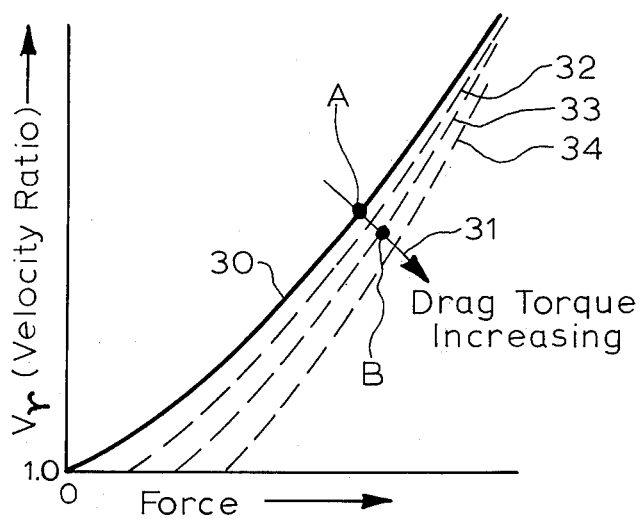
FIGS. 2 and 3 are graphical representations, useful in understanding the invention.

FIG. 2 is a plot of the velocity ratio $V_r$ (reel velocity/capstan velocity) plotted against the force F applied to the supply reel. The solid line curve 30 depicts the increase above a velocity ratio of unity as the force F is increased. At all points on this curve the drag torque $T_{torq}$ is equal to the tape tension $T_s$. As the drag torque $T_{torq}$ is increased at any point on the curve, the velocity ratio would be decreased in a direction indicated by the arrow 31. An increase in drag torque would provide a change in the velocity ratio curves as depicted by the broken line curves 32, 33 and 34. When operating at point A on curve 30, if the drag torque is then increased, the operating point is displaced from point A on curve 30 to point B on curve 33. If the tape tension $T_s$ is then increased, the velocity ratio $V_r$ between the supply reel and capstan will be increased, and this would be signified by displacement of the operating point along line 31 from point B back to point A. If the tension $T_{torq}$ is still present, the initial reduction in velocity ratio (from A to B) due to the increase in $T_{torq}$ is later offset by the addition of tape tension $T_s$ (movement from B to A). This explanation demonstrates it is possible to effectively cancel out the effect of the tape tension $T_s$ with a drag torque $T_{torq}$. In a first order approximation, this occurs where the drag torque $T_{torq}$ is equal to the tape tension $T_s$. This condition also obtains for the curve 30 in FIG. 2, which additionally represents the condition of zero tension $T_s$ in the tape and no drag torque $T_{torq}$. By controlling the amount of drag torque and the supply reel interaction tape tension, a tape transport system can be made to operate along any of the family of curves shown in FIG. 2.

It is also apparent that starting from the curve 30, if the drag torque is decreased or if the tape tension is increased, a related family of curves can be generated in the area above the solid curve 30. In the same way the tape transport can be operated along a velocity-ratio curve above curve 30 by either increasing the tape tension $T_s$ or decreasing the drag torque $T_{torq}$.

Figure 3:
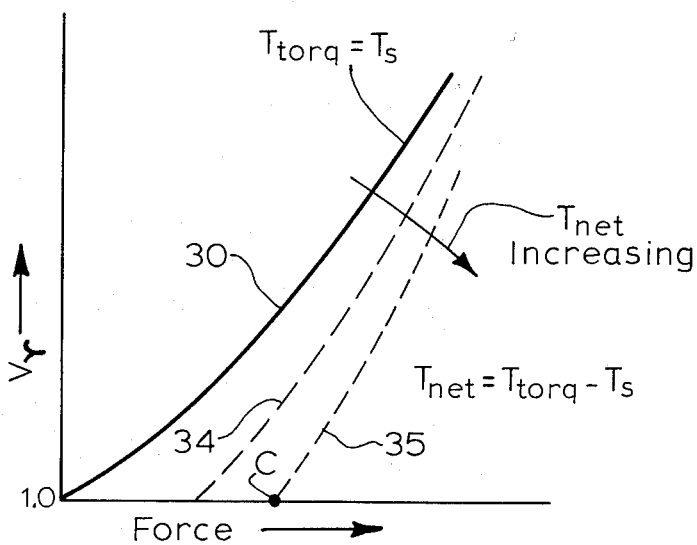

Various structural combinations can be based on this teaching. Consider the illustration of FIG. 3, which includes $V_r/F$ curves 30, 34 and 35. The system operating point is at C, which lies on the abscissa denoting unity velocity ratio. Accordingly, by proper selection of the drag torque $T_{torq}$ it is possible to operate at a velocity ratio of unity, providing uniform tape tension and corresponding ease of head mounting. This can be accomplished in practice by (1) applying identical forces F on the supply and takeup reels, and (2) utilizing a brake type drag mechanism to supply the drag torque $T_{torq}$ for the supply reel. A mechanical structure for accomplishing (1) and (2) will now be described.

FIG. 4 depicts structural details of a tape transport employed to prove that the principles of the invention set out above are indeed sound in practice. As there shown, a base plate 9 provides a reference for the mounting and interaction of the other components. The capstan, supply and takeup reels are numbered with the same reference numerals as employed in FIG. 1. The bearing members for receiving the shafts 11, 17 and 18 are below the level of base plate 9 and are thus not visible. A support block assembly 40 was provided to support a bearing 41 which receives the upper portion of capstan shaft 11. This assists in maintaining alignment of this shaft throughout the range of high speed operation. A pair of heads 42, 43 are mounted adjacent the capstan 12, so that the active portions of the heads positioned closely adjacent the tape path can provide for erase and record functions. Those skilled in the art will appreciate that the electronic connections need not be shown to understand these mechanical operations, and that mechanically identical heads can also be utilized to read out the information from the tape as well as record information on the tape.

A pair of end brackets 45, 46 are positioned at and affixed to each end of the base plate, but only the bracket at the right end of the plate are visible in this view. A pair of longitudinal indexing shafts 47, 48 extend completely along the length of the base plate and beneath the plate, with their extremities received in the brackets 45, 46 and the corresponding brackets at the other end of the base plate. Only one of the reel supports or carriages 50 is visible in this view. Support 50 is generally I-shaped as viewed from above, having a central web portion 51 and four arm portions 52 extending from the central web. Each of the arm portions 52 has a depending support area 53 in which a bearing 54 is journalled to provide for sliding motion of the carriage 50 along the index rods 47, 48 with a minimum of friction. An exactly similar carriage support is provided for the supply reel 13. During system operation the effective diameters of the tape packs 14, 16 on the supply and takeup reels change, and the reels themselves move toward and away from the capstan. Accordingly a central channel 55 is provided in the base plate to afford movement of the reel shafts 17, 18 back and forth during the operation of the tape transport.

There are two important components in the inventive combination utilized to provide the requisite forces and torques described above in connection with FIGS. 1–3. The first requirement, already explained, is that equal forces be applied to both the takeup and supply reels. FIG. 5 shows that, in accordance with this invention, a bias means 60 is coupled to the shafts 17 and 18 which index the supply and takeup reels and their supports. In the embodiment illustrated a simple spring was utilized to provide exactly the same force on each reel. It was also found that a band of elastomer material, such as rubber, is satisfactory for applying the requisite forces. Shaft 17 is received in a bearing support 57 (which in turn is received in the carriage) and passes through base plate 9 as shown. Similarly shaft 18 passes through -Uber bearing support 58 (also received in its carriage 50), base plate 9 and extends above the surface of the base plate. The other components, such as the driving motor for the capstan, are omitted for the sake of simplicity. Because of the high speeds in which the tape moves through these systems, it is generally expedient to employ 1 or 2 pulley systems between the drive motor and the capstan shaft 11. This can be done by arrangements now known in this art; see, for example, the drive arrangement depicted in FIG. 3 of U.S. Pat. No. 3,460,781-uber and the associated description of that system. Thus the spring 60 urges both the supply reel and the takeup reel against the capstan with the same force, satisfying the first criterion developed in connection with FIGS. 1–3.

In accordance with another important aspect of this invention, and as shown in FIG. 4, a brake means 61, 62 is positioned to apply a drag force on the supply reel during transfer of the tape from the supply reel to the takeup reel. In this embodiment the brake means took the form of a simple leather thong 61 wound around the upstanding hub portion 70 of the supply reel, and thong 61 was connected to a small spring 62 at one end. The other ends of the thong 61 and of the spring 62 were connected by simple hooks to the respective eye units supported in side plate 63, affixed to the base plate 9. The small frictional forces developed with engagement of the thong against hub 70 of the supply reel provided a sufficient drag force on this reel during tape transfer to demonstrate the validity of the explanation given above in connection with FIGS. 1–3. Of course when tape is run in the reverse direction the brake means 61, 62 must be disconnected from the supply reel and a corresponding component connected to bear against hub 71 of the takeup reel 15, as reel 15 functions as a supply reel during tape transfer back to reel 13.

The present invention provides the advantage of a simplified and more economical structure in a tape transport for the very high speed transfer of tape in a system where the tape passes directly from the supply reel around the capstan to the takeup reel. In particular the complex and expensive arrangements generally used in this art, to supply different compressive forces at two points, are not required with the much simpler and more economical arrangement of this invention. It is emphasized that the invention consists not only in the simple mechanical structure, but also in the analysis of related known systems to illustrate, as set out above in connection with FIGS. 1–3, the theoretical basis for operating such a transport at unity velocity ratio with equal forces applied to both reels and a single additional drag force then applied to the supply reel during tape transfer. The analysis of the problems extant in known systems to identify the areas where an unobvious solution can be incorporated represents a significant part of the inventive act.

Although only a specific embodiment of the invention has been described and illustrated, it is apparent that various modifications and alterations may be made therein. It is therefore the intention in the appended claims to cover all such modifications and alterations which may fall within the true spirit and scope of the invention.

What is claimed is:

1. A tape transport including a capstan having a resilient outer surface, a first reel support including a first central indexing shaft mounted for movement toward and away from the capstan, a supply reel having a shaft portion received in the first reel support and positioned such that a magnetic tape pack on the supply reel can abut the capstan, a second reel support including a second central indexing shaft mounted for movement toward and away from the capstan, and a takeup reel having a shaft portion received in the second reel support and positioned such that a magnetic tape pack on the take-up reel can abut the capstan, said supply and take-up reels providing the entire support for the tape packs, characterized by bias means including a spring coupled to both the first and second central indexing shafts to apply the same force between the supply reel and capstan as is applied between the take-up reel and capstan, and brake means, positioned to apply a drag force to the supply reel during transfer of the tape from the supply reel to the take-up reel, with no component applying any force to the take-up reel during such tape transfer.

2. A tape transport as claimed in claim 1, and further comprising a base plate positioned to support the several transport components, a pair of indexing shafts supported beneath said base plate, and a pair of reel support carriages, each journalled on said indexing shafts for rectalinear sliding motion to accommodate movement of the first and second reel supports during operation of the tape transport.

3. A tape transport as claimed in claim 1, and in which said brake means includes a flexible member, biased into engagement with the first reel support on at least a portion of said support, to supply the drag force on the supply reel.

* * * * *